July 29, 1930. E. M. RICHARDS 1,771,818
IRONING MACHINE
Filed Oct. 24, 1923 7 Sheets-Sheet 2
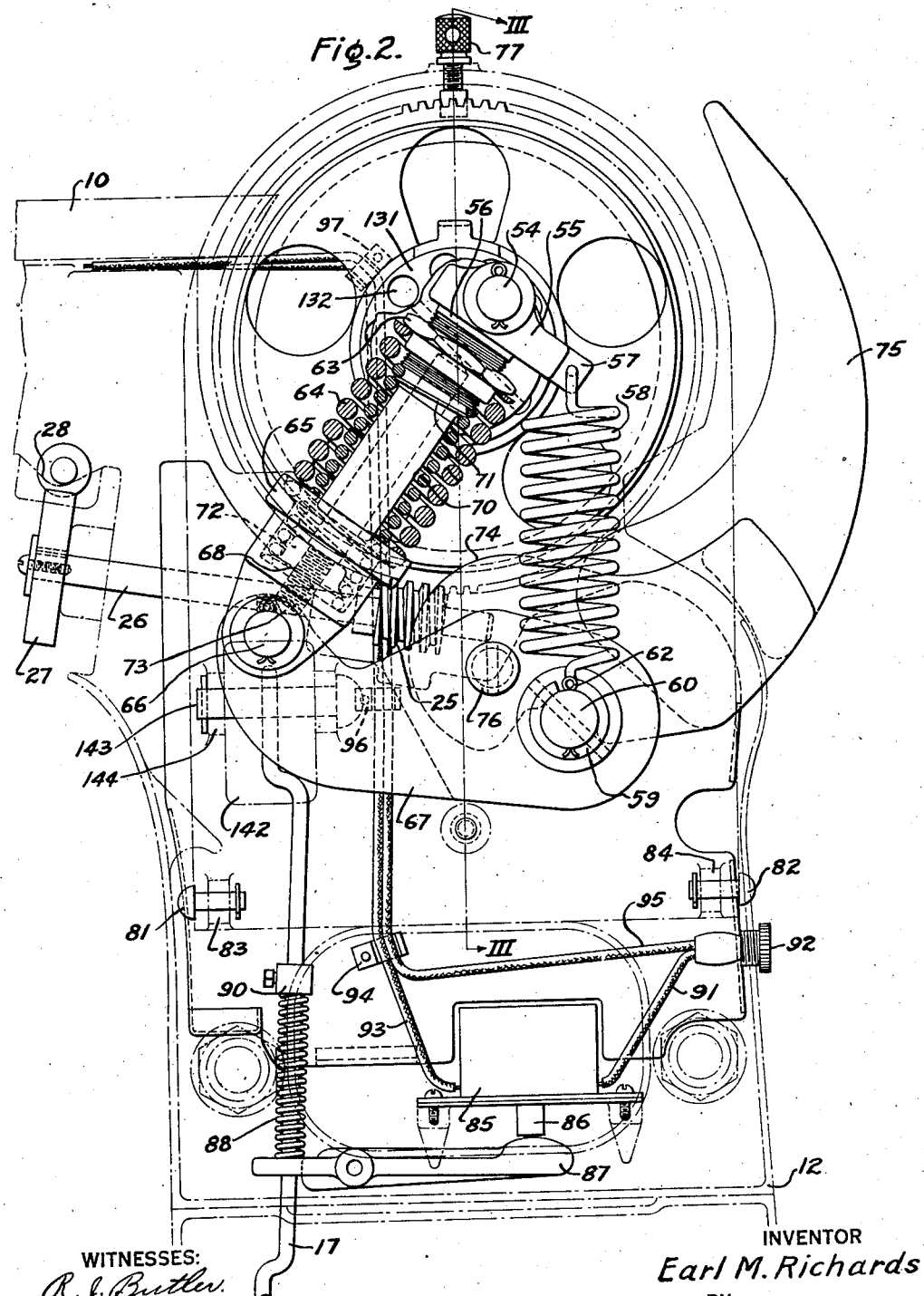
WITNESSES:
R. J. Butler
J. P. Shea
INVENTOR
Earl M. Richards
BY
Wesley G. Carr
ATTORNEY

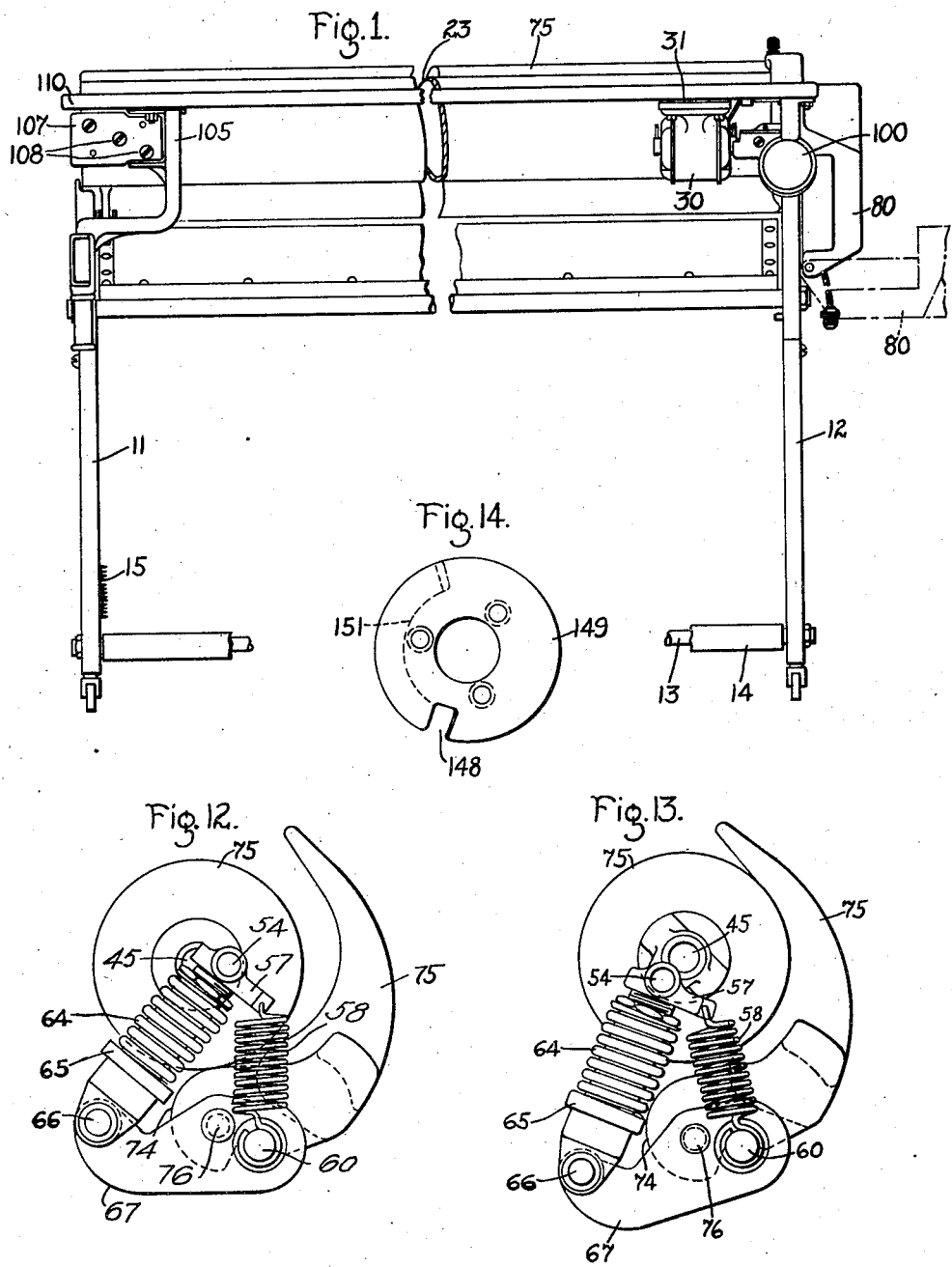

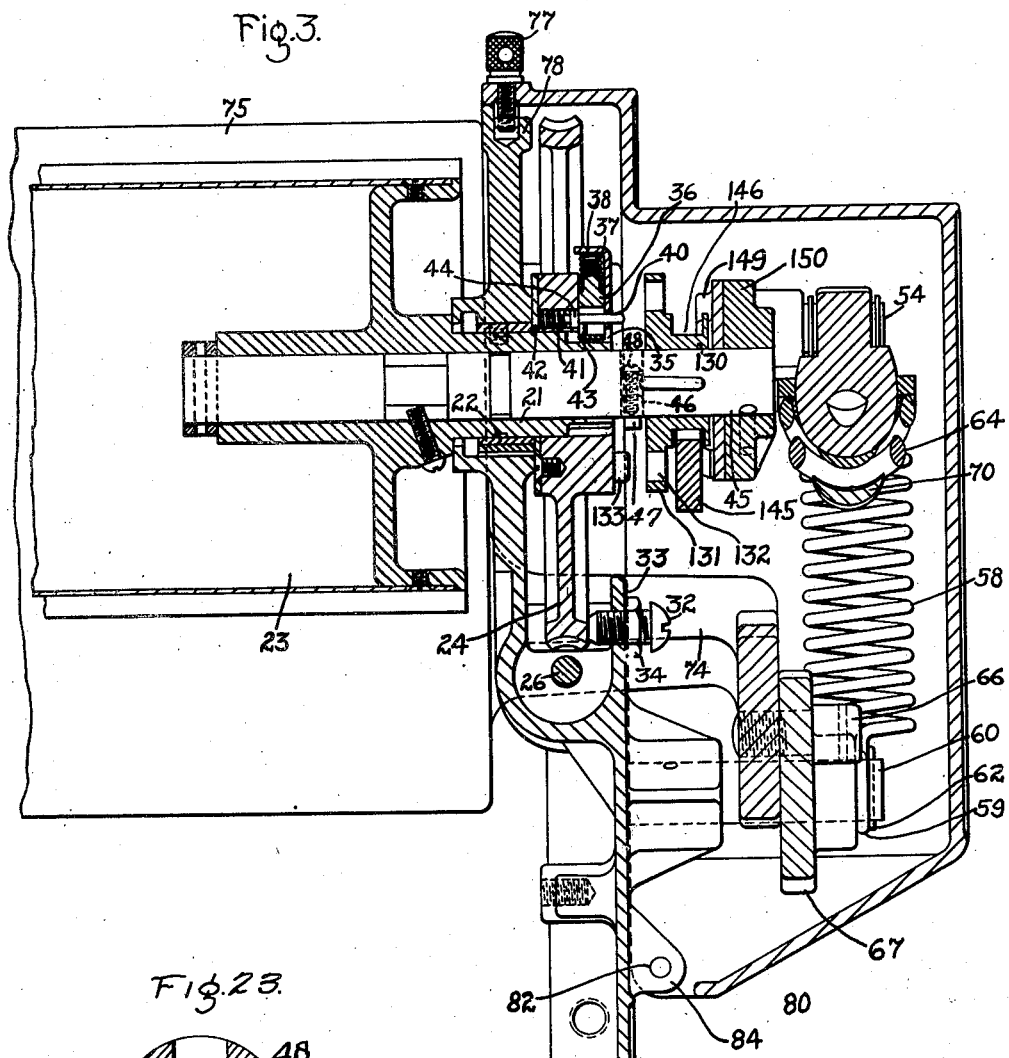
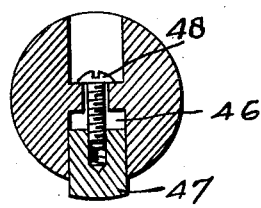

July 29, 1930.  E. M. RICHARDS  1,771,818
IRONING MACHINE
Filed Oct. 24, 1923   7 Sheets-Sheet 4

WITNESSES:
R. J. Butler.
J. P. Shea

INVENTOR
Earl M. Richards
BY
Wesley G. Carr
ATTORNEY

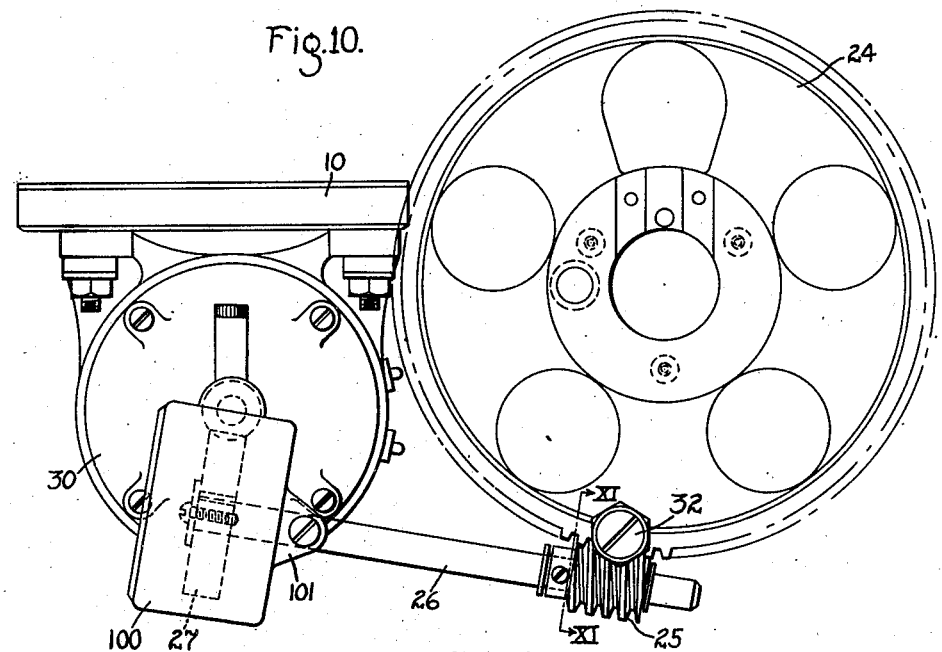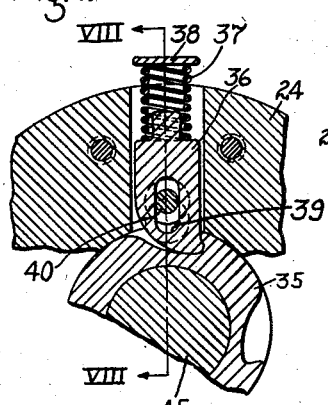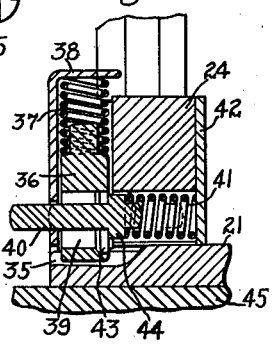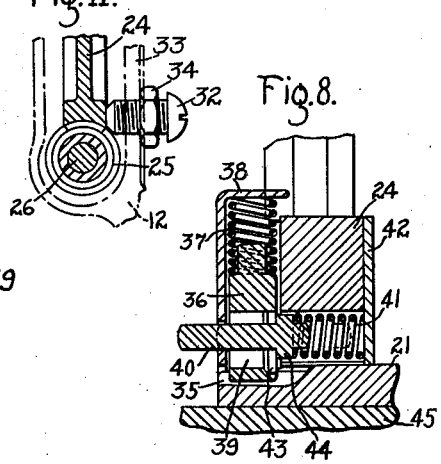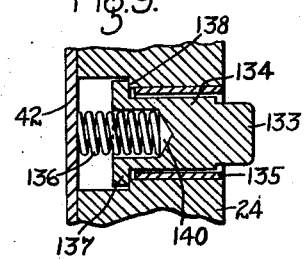

July 29, 1930.  E. M. RICHARDS  1,771,818
IRONING MACHINE
Filed Oct. 24, 1923   7 Sheets-Sheet 6
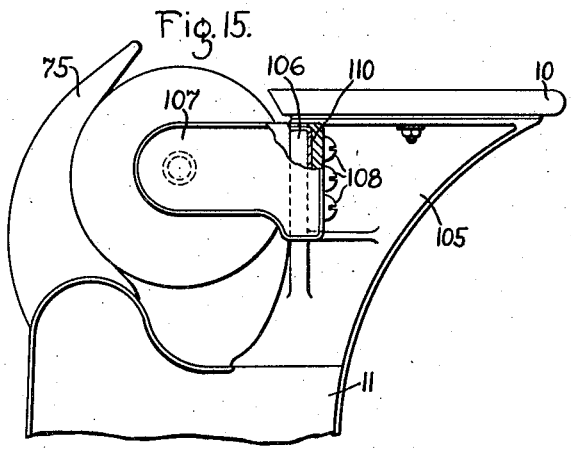
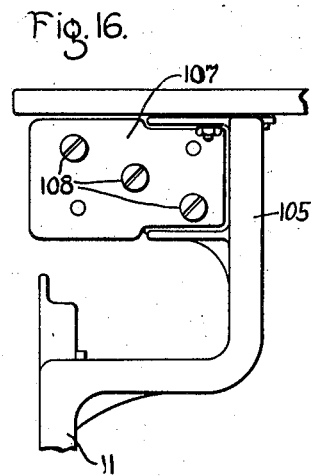
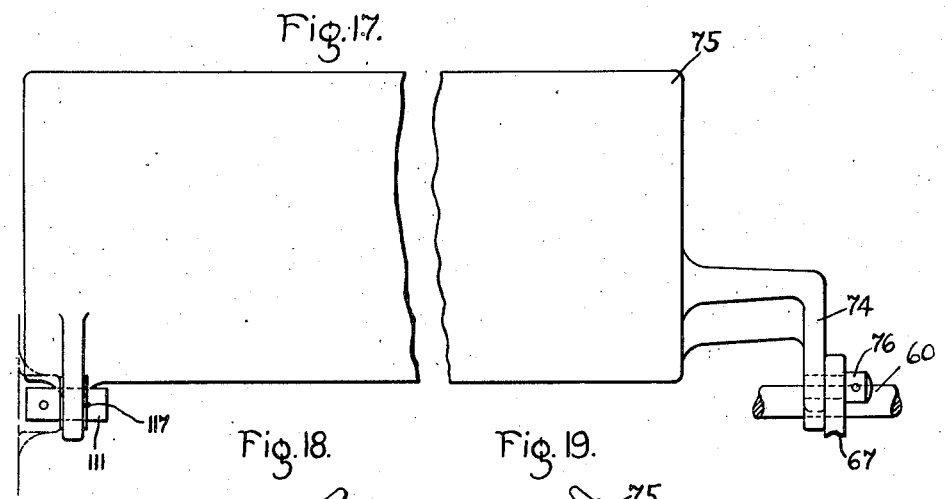
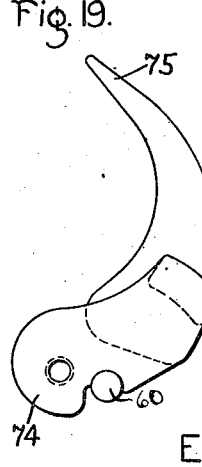
WITNESSES:
R. J. Butler
J. P. Shea
INVENTOR
Earl M. Richards.
BY
Wesley G. Carr
ATTORNEY July 29, 1930.                 E. M. RICHARDS                 1,771,818
                                IRONING MACHINE
                         Filed Oct. 24, 1923       7 Sheets-Sheet 7
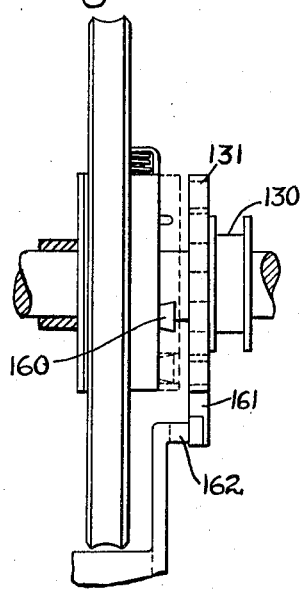
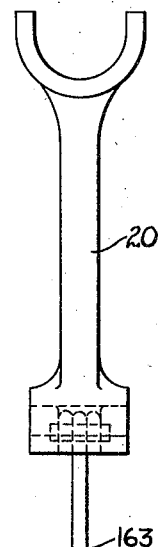
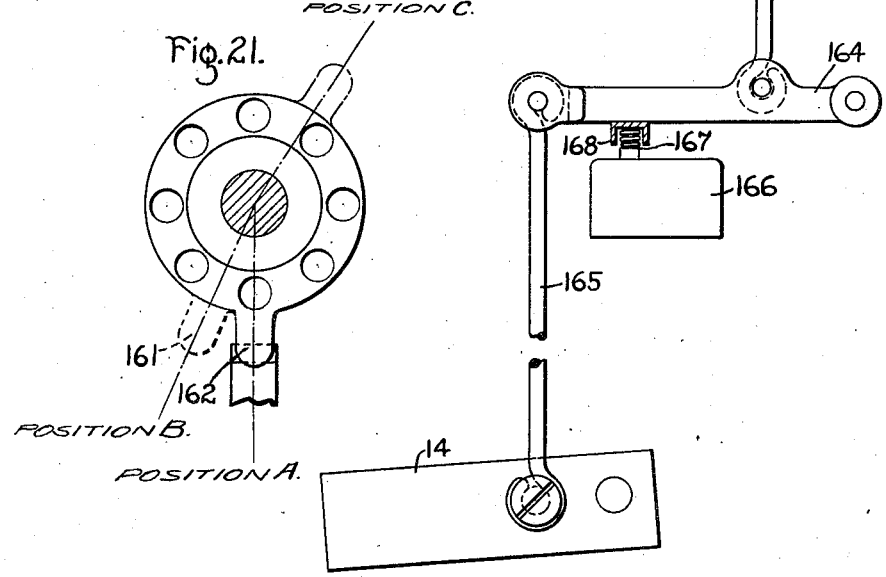
WITNESSES:
R. J. Butler
J. P. Shea
INVENTOR
Earl M. Richards.
BY
Wesley G. Carr
ATTORNEY Patented July 29, 1930

1,771,818

UNITED STATES PATENT OFFICE

EARL M. RICHARDS, OF PITTSBURGH, PENNSYLVANIA, ASSIGNOR TO H. O. SWOBODA, INC., OF PITTSBURGH, PENNSYLVANIA, A CORPORATION OF PENNSYLVANIA

IRONING MACHINE

Application filed October 24, 1923. Serial No. 670,512.

My invention relates to ironing machines and it has special relation to the type illustrated and described in my copending application, Serial No. 501,881, filed September 20, 1921, for ironing machines.

One object of my invention is the provision of an ironing machine comprising ironing elements, one of which is operable by a motor for movement toward the other, and movable instantaneously away from the other whenever desired.

Another object of the invention is the provision of an arrangement whereby an instantaneous release of the shoe is possible upon failure of motor current.

A further object of the invention is the provision of means which make it impossible to stop the roll with the shoe against it.

A still further object of the invention is the provision of means for absorbing the energy released at the initiation of outward movement of the shoe, so as to eliminate noise, jarring and strains on the machine.

A still further object of the invention is the provision of structure of such nature that the shoe with heating equipment may be readily removed as a complete unit and another substituted.

A still further object of the invention is the provision of yieldable means for operating the motor switch and unyieldable means for actuating the clutch lever of the shoe engagement mechanism.

Still further objects of the invention are the provision of means for adjusting the ironer to compensate for irregularities in the floor; means for permitting the freeing of the roll from the driving mechanism so that it may be moved back and forth manually, and the provision of an adjustable open end for the machine.

Other objects will appear as the description proceeds.

In the drawings—

Figure 1 is a front elevational view of an embodiment of the invention,

Fig. 2 is an end elevational view of the right hand end of the machine, the guard being removed and the end frame being shown in dot and dash lines, Fig. 3 is a sectional view on the line III—III of Fig. 2, Fig. 4 is a front elevational view of the right hand end of the machine with the guard in lowered position and with the end frame shown in dot and dash lines, Fig. 5 is a detail view of a clutch member and cooperating parts on the line V—V of Fig. 4, Fig. 6 is a detail view of a caster, Fig. 7 is a sectional view on the line VII—VII of Fig. 4, Fig. 8 is a sectional view on the line VIII—VIII of Fig. 7.

Fig. 9 is a sectional view on the line IX—IX of Fig. 4,

Fig. 10 is an end elevational view of the gear and motor connections,

Fig. 11 is a detail view in section on the line XI—XI of Fig. 10,

Figs. 12 and 13 are end elevations of a roll and shoe engagement mechanism,

Fig. 14 is a detail of the crank plate.

Fig. 15 is an elevational view of the left end of the machine,

Fig. 16 is a fragmentary front elevational view of the left end frame and the bracket carried thereby.

Figs. 17, 18 and 19 are detail views of the shoe,

Figs. 20 and 21 are elevational views of a modified form of clutch.

Fig. 22 is an elevational view of a modified form of actuating device for a switch and a bell crank.

Fig. 23 is a cross-sectional detail view of a shaft, showing a stop therein.

Figure 4:
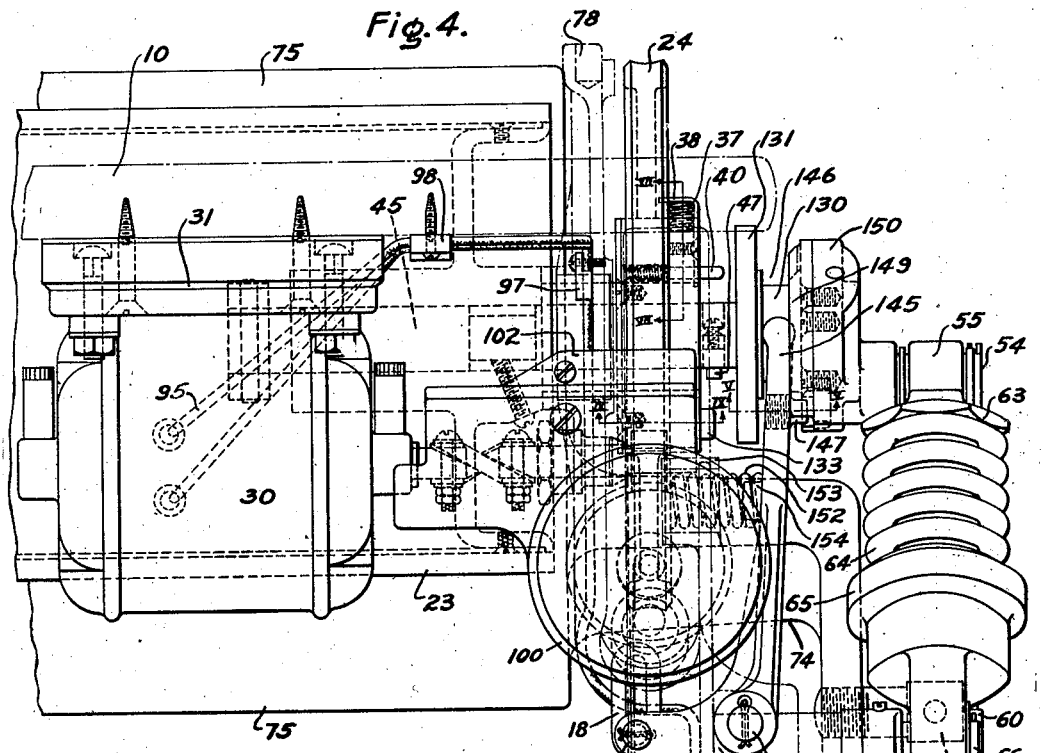
Figure 5:
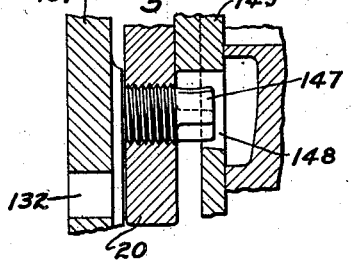
Figure 6:
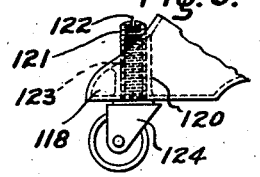

A feed board 10 is secured to end frames 11 and 12. A longitudinal pivot rod 13 is secured adjacent the lower extremities of the end frames, on which pedal 14 is pivoted and normally maintained in elevated position by spring 15. A rod 17 is pivotally secured to one end of the pedal and extends upwardly adjacent end frame 12 being formed into a loop 18 at its upper end through which a pin 19 extends carried by a bell crank lever 20 pivoted on end frame 12.

A tubular member 21 is journaled in a bearing 22 in the end frame 12 and is rigid with a roll 23. A worm gear 24 is rotatably mounted on the tubular member 21 and meshes with a worm 25 on one end of a rod 26 rigid at its other end with a helical gear 27. The helical gear 27 meshes with a second helical gear 28 driven by a motor 30, as described in my copending application above identified the motor being secured under feed board 10. (Figs. 1 and 10). Between the motor and the feed board, a flexible pad 31 is interposed for taking up vibration and deadening the sound of the motor. Longitudinal movement of worm gear 24 is prevented by end frame 12, and a screw 32 threaded in a lug 33 and locked in position by a nut 34.

An annular ratchet 35 is formed on tubular member 21 and a slidable detent 36 (Figs. 3, 7 and 8) in a recess in the worm gear 24, is movable in contact with the ratchet by a spring 37 which contacts at one end with the detent 36 and at the other with the end of a bent plate 38 secured to the face of the worm gear 24. The detent 36 is provided with a longitudinal slot 39 through which a plunger 40 extends urged in a direction away from the worm gear 24 by a spring 41 contacting with a plate 42 also secured to the worm gear 24. The detent is provided with a recess 43 adapted to receive a shoulder 44 on the plunger.

Tubular member 21 is rotatable around a shaft 45 which extends interiorly of the end of the roll 23. The shaft 45 has a transverse opening 46 slidably receiving a stop 47 having a head 48 adapted to contact with a constriction in the opening for limiting the projection of the stop beyond the opening.

A clutch sleeve 130 is keyed for longitudinal movement on the shaft 45 (Figs. 3 and 4) and is provided with a flange 131 having a series of circular holes 132 therein each adapted when the clutch sleeve 130 is against worm gear 24 to receive the reduced cylindrical end 133 of a clutch member 134 slidable in a bushing 135 in the worm gear 24 under the expansive action of a spring 136, and limited in outward travel by a flange 137 contacting with a shoulder 138. The spring 136 has one end received in a recess 140 in the clutch member and contacts at its other end with plate 42, which tends to maintain the clutch member in outer position.

Bell crank lever 20 extends through an opening 142 in end frame 12 and is pivoted on a pin 143 extending through a pair of spaced lugs 144 on the outer face of the end frame 12. An arm of the lever 20 extends upwardly and is formed at its end into a yoke 145 received in a race 146 in the clutch sleeve 130. A lug 147 is threaded into the bell crank lever 20 adjacent the yoke 145, and is adapted to be received in a slot 148 in crank plate 149 secured to the inner face of the crank 150. The crank 150 is rigid with shaft 45, and the crank plate 149 is provided with an arcuate flange 151 extending for a distance of somewhat less than half a circle from slot 148.

A spring 152 projects from pocket 153 formed on the end frame 12 and envelops a lug 154 on bell crank lever 20 urging the upper arm thereof outwardly.

The crank 150 is provided with a crank pin 54 (Figs. 2, 3, 4, 12 and 13) journaled in head 55 rigid with a sleeve 56 and having a lug 57 laterally projecting and pivotally secured to one end of a spring 58, the other end of which is formed into an eye 59 enveloping a pin 60 that projects laterally from end frame 12. Outward movement of the eye 59 is prevented by a cotter pin 62.

A nut 63 is threaded on sleeve 56 and contacts with one end of the crank spring 64, the other end of which is received in a cup member 65 in which is journaled a pivot 66 carried by a link 67. A rod 68 is threaded in cup member 65 and is slidably received in the sleeve 56. An absorption spring 70 is secured between thread 71 on sleeve 56 and the nut 72 threaded on rod 68.

Link 67 is pivotally secured to an arm 74, that is rigid with the ironing shoe 75, by means of a pin 76, threaded in the arm 74. The arm is provided with an arcuate recess for the pin 60.

A guard 80 is pivotally supported by pins 81 and 82 on lugs 83 and 84, respectively, formed on the end frame 12, for enclosing the operating mechanism. The guard 80 is retained in closed position shown in Figure 3, by the screw 77 threaded therein and received in a recess 78 in the edge of end frame 12, the screw having an enlarged head to prevent removal thereof.

A switch 85 is secured on the inner face of the end frame 12 and has a button 86 projecting therefrom in contact with a lever 87. The switch 85 is of a conventional type adapted to close a circuit on one actuation of the button and to open the circuit on a second actuation thereof. Lever 87 is pivoted to end frame 12 and is forked at its other end to straddle actuating rod 17. A spring 88 contacts at one end with the forked end of the lever 87 and at its other end with a stop 90 on the actuating rod.

An electrical conductor 91 extends through a bushing 92 to switch 85 from which electrical conductor 93 leads through a retainer 94 on the end frame. Electrical conductor 95 extends from bushing 92 to retainer 94 whence electrical conductors 95 and 93 lead through retainers 96 and 97 to a point adjacent the feed board 10 and through a retainer 98 on the feed board to the motor 30.

A casing 100 is provided for helical gear 27 and is secured to end frame 12 by an ear 101. The casing also houses the driving connections between the motor 30 and the helical gear 28 and its open top is closed by a cap 102.

End frame 11 is provided with an L-shaped support 105 for feed board 10, a web 106 being formed on the support and laterally projecting therefrom. An L-shaped bracket 107 is detachably secured to the web by screws 108, a shim 110 being interposed between the web 106 and the bracket 107. An arm of the bracket extends around the end of the roll and rotatably supports the same in open position adjacent the shoe 75.

A stud 111 projects laterally from end frame 11 and an arm 113, integral with the shoe, is secured thereto by means of a cap 114 on the arm 113. The arm 113 and the cap are cut away to provide an opening 116 which receives the stud 111, a cotter pin 117 extending through the pin to retain the arm in position.

End frame 11 is formed into an angular foot 118 having a tubular portion 120 in which an adjustable hollow sleeve 121 is threaded. The shank 123 of a caster 124 is rotatably received in the sleeve.

Operation: Assuming that the shoe is in the position shown in Fig. 13 immediately adjacent the roll (the ironing position) the operator, in order to move the shoe back depresses the pedal 14 to move actuating rod 17 and lever 87 downwardly to operate switch 85. The circuit through conductors 91, 93 and 95 is thus broken and the motor stopped. After rod 17 has been moved downwardly a short distance the upper portion of loop 18 is brought into contact with pin 19 thus rotating bell crank 20 about pin 143 to withdraw lug 147 from slot 148 in crank plate 149. Spring 64, which is compressed between cup member 65 and nut 63, is then permitted to expand as the lug 147 no longer locks the crank with the crank pin in the position shown in Fig. 13. The expansion of crank spring 64 moves crank pin 54 approximately through an arc of 180°, a sliding movement between the sleeve 56 and rod 68 occurring. The action of crank spring 64 is instantaneous as the crank pin 54 is disposed off center, that is, the line running through the centers of pivot 66 and crank pin 54 is in an advanced position with respect to a line running through the centers of pivot 66 and shaft 45. The crank pin 54 and shaft 45 are rotated rapidly but absorption spring 70 which is designed to absorb all energy in excess of that required in the release operation tends to eliminate shock and to check the rapidity of movement of the crank pin as it nears the position shown in Fig. 12. As crank pin 54 nears the end of its travel, shoe 75 falls back by gravity. The shoe is so disposed that its weight tends to rotate it to outer position and away from the roll immediately on the release of the crank. The action is such that the shoe almost instantaneously reaches its outermost position. As the shoe nears its outermost position the resilient action of the spring 64 tends on the compression thereof, to prevent further outward movement of the shoe under its own momentum. However, the shoe may be moved out further manually for cleaning the same without the dismantling of any part. It will be noted that the release action of the shoe is such that it may take place even at a time when the current is off the line. The same movement of pedal 14 which stops the roll also throws out the shoe. Accordingly burning of the clothes or roll by reason of the hot shoe being held stationary against the roll is impossible.

It will be further noted that the depression of pedal 14 operates through spring 88 to move lever 87. The action of lever 87 is therefore a yielding one so that the switch 85 is not subjected to danger of damage. The throwing of bell crank lever 20 is not, however, accomplished by springs or yielding members but is produced directly and positively by actuating rod 17.

The release movement of clutch sleeve 130 is limited by stop 47 which, in the position of parts shown in Figures 3 and 13, extends below shaft 45 to prevent the clutch sleeve 130 from being thrown in contact with worm gear 24.

After the release of the shoe and its movement away from the roll the stop 47 is in inverted position causing it to fall completely within the circumference of the shaft so that longitudinal movement of the clutch sleeve on the shaft past the stop is permitted. Thus clutch 130 may be brought in contact with the worm gear 24.

When it is desired to move the shoe from the outer position of rest shown in Fig. 12 to the position shown in Fig. 13 the operator depresses pedal 14 and thus moves operating rod 17 downwardly to operate switch 85 and start the motor 30 which rotates helical gear 28, helical gear 27, shaft 26, worm 25 and worm gear 24 turning the worm gear 24 in a clockwise direction as viewed in Fig. 10. Detent 36 being maintained in engagement with the annular ratchet 35 by means of spring 37, tubular member 21 and the roll 23 are rotated.

Simultaneously with the downward movement of actuating rod 17 clutch sleeve 130 is actuated by bell crank lever 20 through the action of the lever. The clutch sleeve 130 slides on shaft 45 into contact with the worm gear 24. Stop 47, as described, is within the cylindrical surface of shaft 45 and does not prevent this operation. The movement of clutch 130 against worm gear 24 is not prevented by clutch member 134 as spring 136 permits the inward movement of the clutch member. After slight rotation of worm gear 24 clutch member 134 is urged by spring 136 into one of the holes 132. This locks the clutch sleeve 130 rigid with the worm gear 24.

Rotation of the worm gear 24 then operates through clutch 130 to rotate shaft 45 and crank 150. Crank pin 54 is thus moved downwardly and forwardly to compress crank spring 64 and to depress pin 66 and the end of link 67, thereby moving the shoe 75 upwardly about pin 60 as a fulcrum into contact with the roll 23.

At the time pedal 14 is moved downwardly for raising the shoe, lug 147 on bell crank 20 is disposed adjacent the inclined end of flange 151 on cam plate 149 (Fig. 14). After the rotation of the crank 150 a slight distance, movement of the clutch sleeve 130 in a direction away from the worm gear 24 is prevented by the action of lug 147 which rides along the face of the flange 151 and prevents movement of the lever 20 under the impulse of the spring 152.

In the rotation of crank 150 slot 148 is brought adjacent to lug 147. The action of spring 152 then tends to insert the lug into the slot by a movement of bell crank 20. As the lug 147 slips into the slot the clutch sleeve 130 is moved out of engagement with clutch member 134. Since the clutch is thus thrown out the rotation of worm gear 24 is not communicated to shaft 45. Crank 150 is then arrested through the action of the lug 147 entering the slot 148. The slot 148 is of larger dimensions than the lug 147. The action occurs just at, or slightly before, spring 64 reaches dead center position. There is sufficient play in slot 148 to permit the friction between the rotating worm wheel 24 and the shaft 45 to rotate the latter a limited distance after the lug 147 enters the slot 148. The parts then assume the position shown in Fig. 13.

When the parts are in the position just described, crank pin 54 is disposed forwardly, (in the direction of rotation of the roll) with respect to a line running through the axis of shaft 45 and the center of pivot 66. This location of parts permits the instantaneous action of the crank spring 64 on the release of the crank 150. In order that the crank may be arrested with the parts in the position shown, the movement of the crank must be so timed that the clutch lever lug slips into the slot before rapid movement of the crank pin 54 is caused by spring 64. This is accomplished by proper proportioning of the taper of the lug 147, the travel of the clutch sleeve 130, the position and strength of clutch lever spring 152 and the location of the slot 148 in the crank plate 149.

It will be noted that considerably less than half a revolution of crank pin 54 occurs in its movement from the position shown in Fig. 12 to that in Fig. 13. In the position in Fig. 12 the parts are not in dead center position but the crank pin 54 is disposed forwardly (in the direction of rotation) of a line running through pivot 66 and shaft 45. The position of pin 54 is due largely to the action of tension spring 58 which counteracts the tendency of crank spring 64 to maintain the parts in dead center position. The tension of spring 58 thus operates by reason of this holding of the crank pin 54 in an advanced position to expedite the movement of the shoe towards the roll. It requires less time to move the shoe from the position shown in Fig. 12 to that of Fig. 13 than if half a revolution of the crank pin 54 were necessary.

Freeing the roll from the driving mechanism to move it back and forth freely is sometimes desired in removing or replacing padding or when locating a piece of clothing for accurate initial contact with the shoe. With the shoe open the roll may be turned in a counter clockwise direction as viewed in Fig. 2, causing the detent 36 (Fig. 7) to be moved upwardly by reason of its contact with the annular ratchet. After the detent has traveled a sufficient distance the shoulder 44 of plunger 40 slides into recess 43 in the detent 36 which is thus retained in disengaged position. The roll 23 may then be moved manually back and forth.

Stepping on the pedal 14 relocks the roll to the driving mechanism as the downward movement of the pedal results, as already described, in the movement of bell crank lever 20 and clutch sleeve 130. The sliding of the clutch sleeve 130 into contact with worm gear 24 results in plunger 40 being pushed inward removing shoulder 44 from recess 43, which permits the detent 36 to move downwardly under the force of spring 37 into one of the slots in ratchet 35 as soon as said detent 36 is rotated over the top of said slot. The plunger is then maintained retracted by the contact of shoulder 44 with the detent 36.

The shoe is made a complete unit in itself having no gas, wire or gasoline connection with the rest of the machine. It is merely set upon the ironer pivoting on stud 111 and pin 60. By removing cotter pin 117 and pin 76 (Figs. 12 and 13) and sliding the shoe longitudinally to disengage it from stud 111, the shoe may be lifted and another shoe may be substituted in an obvious manner. Interchangeability of shoes is, therefore, made possible.

Heretofore, it has been considered impractical to produce the spring pressure on the shoe all at one end thereof due to the distortion of the whole structure that may result and which would produce a non-uniform pressure. These difficulties are avoided in the novel construction herein by providing an adjustable end so that the roll can be spaced a greater or lesser distance from the shoe to compensate for distortion and variations in parts. The adjustment is affected by removal of shim 110 and the substitution of narrower or thicker shims. Since the bracket 107 is thus adjusted the roll is also adjusted, it being supported by the bracket. The bracket 107 not only permits adjustment of the end of the roll but maintains an open end for the ironing elements so that a garment may be conveniently introduced between the shoe and the roll at the end. This facilitates ironing pieces of peculiar or unusual shape.

The caster 124 may be adjusted by the rotation of shank sleeve 122 by means of a screw driver. The machine may thus be adapted to irregularities in the floor so as to stand solid. This insures proper alignment of roll and shoe and eliminates unnecessary strains.

In the embodiment of the invention shown in Figs. 1 to 19 inclusive, flange 131 of clutch sleeve 130 is forced off the cylindrical end 133 of clutch member 134 by spring 152 pressing outward on bell crank lever 20 when the ironing elements are to be moved to ironing position. At this time, however, due to crank spring 64 being fully compressed, a considerable frictional resistance exists between flange 131 and cylindrical end 133, and to counteract such frictional resistance, cylindrical end 133 is tapered slightly.

This tapering, however, may impair the positiveness of the engaging operation, because whenever pedal 14 is only lightly actuated, flange 131 and cylindrical end 133 may barely engage at their tips and flange 131 may slip off cylindrical end 133 while the ironing elements are in the process of engaging. This may even happen if cylindrical end 133 were straight.

To insure that such disengagement will not occur and that the engagement will be positive under all conditions it may be desirable to provide an end 160 tapered inward slightly as shown in Fig. 20, instead of outward, whereby all slipping of flange 131 will be in the direction of forcing flange 131 farther on the tapered end.

With this arrangement, to separate the end 160 and flange 131 when the ironing elements are in ironing position a lug 161 having an inclined contact face is located on flange 131 and a projection 162 on end frame 12 is so positioned that lug 161 slides up projection 162 just when the ironing elements are almost in ironing position thus compelling the flange 131 and end 160 to separate at this time automatically through the turning moment developed by the motor. This is the position of parts shown in full lines in Figs. 20 and 21 (position A).

When all parts are settled in ironing position, however, lug 161 must be slightly in advance of the projection 162 as shown in dotted lines in position B of Fig. 21 for otherwise flange 131 would be prevented from moving inward which movement in this position is necessary when releasing the ironing elements. The location of lug 161 when the shoe is away from the roll is shown in dotted line position C of Fig. 21.

The modification shown in Fig. 22 may be provided for the control devices in that figure, bell crank 20 is connected by a link 163 to lever 164 that is pivoted on end frame 12 and coupled by rod 165 to pedal 14. The button of switch 166 (corresponding to switch 85) is located under lever 164, a spring 167 in a retainer 168 being interposed therebetween. The angular movement necessary to push in the button is just sufficient for link 163 to move bell crank 20. No additional load is imposed during the travel of pedal 14, that is, the operator does not feel any movement except the throw of the clutch.

The word "instantaneous" is used throughout the specification and claims, not as signifying action without the lapse of any time interval whatsoever, but as denoting promptness. If a small interval of time occurred between the actuation of shoe release mechanism and the movement of the shoe, the operation would be instantaneous in the sense in which the term is used.

The invention is not limited to the details shown and described but is capable of extensive variation and modification and a substantial range of equivalents is contemplated within the spirit of the invention and scope of the appended claims.

I claim as my invention:

1. In an ironing machine, the combination with a motor, of a pair of cooperating ironing members, one of said ironing members being movable relatively to the other, means for effecting movement by said motor of one of said members into engagement with the other and the rotation of one of said members, and for moving one of said members away from the other independently of the motor speed, and means operative as and incident to said last mentioned movement to bring all of said parts and said motor to rest.

2. In an ironing machine, the combination with a plurality of ironing elements, of a spring for moving one of said elements relatively to the other, means for tensioning said spring, means for releasing said spring and permitting the release of tension therein, and other means for absorbing a portion of the energy of said spring to check the movement of the movable element.

3. In an ironing machine, the combination of a pair of ironing elements one of which is movable towards and away from the other, means for moving said elements together, other means to effect separation of said elements, and resilient means automatically operative on the separation of said elements to return the moved element a part of the distance separated.

4. In an ironing machine, the combination with a roll mounted for rotation, of a shoe mounted for movement toward and away from said roll, driving means for said roll, means for connecting said driving means to said roll, and means for holding said connecting means in inoperative position upon the manual advancement of said roll.

5. In an ironing machine, a plurality of ironing members, power storage means, mechanism effective through said storage means for causing one of said members to move toward the other and for storing available power in said means, means normally holding said power storage means against operation, and means for releasing said power storage means and utilizing the power stored therein.

6. In an ironing machine, a plurality of ironing members, a spring, mechanism effective through said spring for causing one of said members to move toward the other and for storing power in said spring, means for normally holding said spring against action, and means for releasing said spring holding means.

7. In an ironing machine, a plurality of ironing members, means including a compressible member for moving one of said members toward the other, holding means for said compressible member, and means for releasing said holding means for the compressible member.

8. In an ironing machine, a shoe, a roll, actuating mechanism for effecting relative movement between said shoe and roll, said mechanism including relatively movable members, power storage means normally urging said members in one direction, holding means normally preventing operation of said power storage means and means for releasing the holding means for said relatively movable members to permit relative movement between the shoe and roll in the opposite direction.

9. In an ironing machine, the combination of a support, a shaft mounted for rotation thereon, a roll on said shaft constituting an ironing member, a second ironing member pivoted on said support movable toward and away from said roll, means for limiting the movement of said second member away from said roll, a crank rigid with said shaft, a spring connected to said crank and said second member and compressible when the crank moves in one direction and releasable when the crank moves in the opposite direction, and means for locking said crank in position with said spring compressed and off-center with respect to a line extending through said shaft and the point of connection of said spring with the second ironing member, whereby upon the release of said locking means the crank is rotated by said spring.

10. In an ironing machine, ironing members, one of which is movable relatively toward and away from the other, a crank operatively secured to the relatively movable member and rotatable through substantially 360° during each movement of said movable member through one cycle, power mechanism for moving said crank through more than 180° to move said movable member toward the other, and means for releasing said crank for the return movement of said movable member.

11. In an ironing machine, the combination of a support, a shaft, a roll member carried by said shaft, means for rotating said roll, a crank rigid with said shaft, a second ironing member pivoted for movement towards and away from said roll member and having an arm thereon, a spring interposed between said crank and said arm and compressible by the relative movement therebetween, means for locking said crank in position when said spring is compressed, and means for releasing the locking means.

12. In an ironing machine, the combination with a shaft of an ironing member thereon, means supporting said shaft for rotation, a crank rigid with said shaft, a pivotally supported ironing member operatively connected to said shaft, resilient means adapted to rotate said crank in one direction, and other resilient means cooperating with said crank for decreasing the rapidity of such movement of said crank.

13. In an ironing machine, the combination with a shaft, of an ironing member thereon, means supporting said shaft for rotation, a crank rigid with said shaft, a pivotally supported ironing member, resilient means interposed between said last mentioned member and said crank for effecting relative movement therebetween, and resilient means operative when said crank reaches a pre-determined position for retarding further movement thereof.

14. In an ironing machine, the combination of a shaft, a roll thereon, means supporting said shaft for rotation, a crank rigid with said shaft, an oscillating member, an ironing shoe, means pivotally supporting said shoe, means for rotating said shaft and said crank, resilient means interposed between said crank and said member for moving said member, means for moving said shoe on the movement of said member, said crank and said member being adapted to cooperate to compress said resilient means whereby said resilient means is energized to move said crank away from said member and resilient means for retarding the speed of movement of said crank away from said member.

15. In an ironing machine, the combination with a roll, a shoe, means pivotally supporting one end of said shoe, an arm on the other end of said shoe, and means pivotally supporting said arm whereby said shoe is pivoted for movement with respect to said roll, of a shaft, a crank rigid with said shaft, a frame, a link pivotally supported at one end of said frame and movable towards and away from said crank, a spring pivotally connected to said crank and said link, means for locking said crank in a position in which it extends towards said link and compresses said spring, and maintains said spring off center whereby on the release of said crank said spring tends to rotate said crank, and means for releasing said releasable means.

16. In an ironing machine, the combination with a rotatable shaft having an ironing member thereon, means for rotating said member, a crank on said shaft, a pivoted ironing member supported for movement toward and away from said first mentioned ironing member, means for limiting the movement of said pivoted member away from said first ironing member, a rod pivoted to said pivoted member, a sleeve pivoted to said crank having a recess therein adapted to slidably receive said rod, a spring urging said rod in one direction, and a second spring fixed at one end and secured at its other end to said sleeve and maintained under tension, said first mentioned spring being normally at an angle to a line running through the axis of said shaft to the point of pivotal connection of said rod with said member.

17. In an ironing machine, the combination of a shaft, a roll mounted for rotation thereon, means for driving the roll, a shoe mounted for movement toward and away from said roll, and means operative on the rotation of said shaft for moving said shoe from a position of rest to a position adjacent said roll in less than half a revolution of said shaft.

18. In an ironing machine, the combination of a roll mounted for rotation, a motor, a switch for controlling the operation of said motor, means operative on the actuation of said motor for rotating said roll, a shoe mounted for movement toward and away from said roll, mechanical means cooperating with said first mentioned means for moving said shoe toward said roll and instantaneously moving said shoe away from said roll and common control means for actuating said mechanical means and said switch.

19. In an ironing machine, the combination with a roll mounted for rotation and a shoe mounted for movement toward and away from said roll, of a motor, a switch for controlling the operation of said motor, means cooperating with said motor and operative on the actuation thereof to move said shoe toward said roll, yieldable means for actuating said switch, unyieldable means for controlling the operation of said first mentioned means and means for actuating in one movement said yieldable and said unyieldable means.

20. In an ironing machine, the combination with a roll mounted for rotation and a shoe mounted for movement toward and away from said roll, of a motor, a switch for controlling the operation of said motor, means cooperating with said motor and operative on the actuation thereof to move said shoe toward said roll and also operative when the motor is inactive for moving said shoe instantaneously from said roll, yieldable means for actuating said switch, unyieldable means for controlling the operation of said first mentioned means and common means for actuating in one movement said yieldable and said unyieldable means.

21. In an ironing machine, the combination with a motor, and a push button switch for controlling the operation of said motor, of a shaft mounted for rotation, a roll, an ironing member cooperating with said roll, a tubular member carried by said roll and rotatable on said shaft, a gear, driving connections between said motor and said gear, means operative on the rotation of said gear to rotate said roll, a clutch sleeve keyed to said shaft and slidable longitudinally thereof, a clutch member on said gear, a pivoted control lever, an operating rod having an opening at one end thereof, means extending through said opening and securing said lever for pivotal movement with respect to said rod and permitting limited longitudinal movement of said rod, a second lever pivoted to move into contact with said switch and yieldable means operative on the movement of said rod in one direction for actuating said second lever and said switch.

22. In an ironing machine, a plurality of ironing members, one of said members being movable toward and away from the other, a control mechanism, means operable upon one operation of said mechanism for effecting movement of said movable member at one speed, and other means operable upon the succeeding operation of said control mechanism for effecting movement of said movable member at another speed.

23. The combination in an ironer with ironing members, of control mechanism for said members, means operable upon actuation of said control mechanism for producing one characteristic relative movement of said ironing members, and other means operable upon another actuation of said control mechanism for producing a different characteristic relative movement of said members.

24. In an ironing machine, the combination with a frame, of a shoe movable longitudinally relatively thereto and having an opening therein, a support on said frame for said shoe, and a stud on said support adapted to be received in said opening upon relative longitudinal movement between the shoe and the frame, movement of said shoe longitudinally of the frame in the opposite direction disengaging the shoe from said support.

25. The combination in an ironer with ironing members, one of which is movable relatively to the other, of a common means through which movement of said movable member is effected in both directions, said means comprising relatively movable parts, a motor for producing comparatively slow relative movement between said parts in one direction, and means for disconnecting said motor from said common means to render the motor inoperative for controlling movement of said parts in the opposite direction.

26. In an ironing machine, an ironing member, a movable ironing member cooperating therewith, a power means, means for effecting operative engagement between said movable member and power means for movement of said movable member in one direction, and means for effecting disengagement of said operative connection and releasing said power means therefrom during movement of said movable member in the opposite direction.

27. In an ironing machine, the combination of a roll and shoe, one of which is mounted for relative movement toward and away from the other, of clutch means for rotating said roll, and means operable upon manual forward rotation of the roll for rendering said clutch means inoperative.

28. In an ironing machine, ironing members one being mounted for relative movement with respect to the other, electrical means, mechanical means, and a control means operative at succeeding operations for bringing both said electrical means and mechanical means into operation for effecting movement of said movable member relative to the other, and for bringing only said mechanical means into operation in effecting movement of said movable member away from the other.

29. In an ironing machine, ironing members, one being mounted for relative movement with respect to the other, electrical means, mechanical means, and a control means operative at succeeding operations for bringing both said electrical means and mechanical means into operation for effecting movement of said movable member relative to the other, and for bringing only said mechanical means into operation in effecting movement of said movable member away from the other, said control means comprising a common member movable in the same direction for each succeeding operation.

30. In an ironing machine, ironing members, one being mounted for relative movement with respect to the other, electrical means, mechanical means, and a control means operative at succeeding operations for bringing both said electrical means and mechanical means into operation for effecting movement of said movable member relative to the other, and for bringing only said mechanical means into operation in effecting movement of said movable member away from the other, said mechanical means being operable through a less period of time than said electrical means.

31. In an ironing machine, a pair of members adapted to successively assume adjacent and separated relationship, operating mechanism including electrical means for effecting movement of one of said members toward the other to bring them into adjacent relationship, and a control member for said operating mechanism, and means cooperating with said control member whereby said control member is effective upon alternate operations thereof to control movement of said member to idle position exclusive of said electrical means.

32. In an ironing machine, a pair of members adapted to assume adjacent and spaced positions, mechanism including electrical means for effecting movement of one of said members, said mechanism, excluding said electrical means, effecting relative movement of said members from adjacent position to spaced position, a single control for said mechanism having one characteristic movement only, said single control being effective upon every second operation for bringing said mechanism including the electrical means into operation and upon all other operations for bringing said mechanism excluding the electrical means into operation.

In testimony whereof, I have hereunto subscribed my name this 15th day of October, 1923.

EARL M. RICHARDS.